United States Patent
Nishiguchi et al.

(10) Patent No.: US 6,489,429 B2
(45) Date of Patent: Dec. 3, 2002

(54) AMIDOALCOHOL-BLOCKED POLYISOCYANATE

(75) Inventors: Shigeo Nishiguchi, Hiratsuka (JP); Sinzi Hirato, Hiratsuka (JP); Reijiro Nishida, Chigasaki (JP)

(73) Assignee: Kansai Paint Co., Ltd., Hyogo-ken (JP)

(*) Notice: Subject to any disclaimer, the term of this patent is extended or adjusted under 35 U.S.C. 154(b) by 23 days.

(21) Appl. No.: 09/878,376

(22) Filed: Jun. 12, 2001

(65) Prior Publication Data

US 2001/0053828 A1 Dec. 20, 2001

Related U.S. Application Data

(62) Division of application No. 09/466,549, filed on Dec. 17, 1999, now Pat. No. 6,303,707.

(30) Foreign Application Priority Data

Dec. 17, 1998 (JP) ............................................ 10-358546

(51) Int. Cl.$^7$ ..................... C07C 265/04; C07C 265/10; C07C 265/12; C07C 265/14; C08G 18/80
(52) U.S. Cl. .................. 528/45; 523/415; 524/558; 524/571; 524/589; 524/590; 524/591; 525/330.5; 525/332.5; 525/440; 525/528; 560/115; 560/355; 560/359; 560/360
(58) Field of Search .............................. 525/528, 330.5, 525/332.5, 440; 523/415; 524/558, 571, 589, 590, 591; 528/45; 560/115, 355, 359, 360

(56) References Cited

U.S. PATENT DOCUMENTS

| | | | |
|---|---|---|---|
| 5,401,553 A | 3/1995 | Miwa et al. | 524/507 |
| 5,747,166 A | 5/1998 | Schwarte et al. | 524/507 |

FOREIGN PATENT DOCUMENTS

| | | |
|---|---|---|
| JP | 57-145161 | 9/1982 |
| JP | 58-103522 | 6/1983 |
| JP | 8-92508 | 4/1996 |
| JP | 9-53043 | 2/1997 |

*Primary Examiner*—Robert E. L. Sellers
(74) *Attorney, Agent, or Firm*—Wenderoth, Lind & Ponack, L.L.P.

(57) ABSTRACT

There is disclosed a resin composition for electrodeposition paint comprising
(A) a resin containing hydroxyl group, and
(B) a polyisocyanate compound blocked with an amidoalcohol having at least one amide bond and at least one alcoholic hydroxyl group in the molecule, excellent in storage stability and capable of forming a coating film excellent in low temperature curability.

1 Claim, No Drawings

AMIDOALCOHOL-BLOCKED POLYISOCYANATE

This is a divisional of Ser. No. 09/466,549, filed Dec. 17, 1999, U.S. Pat. No. 6,303,707.

BACKGROUND OF THE INVENTION

1. Field of the Invention

The present invention relates to a novel resin composition for electrodeposition paint and, in more detail, relates to a resin composition for electrodeposition paint capable of forming a coating film excellent in anticorrosivity and further excellent in low temperature curability.

2. Description of the Prior Art

As an electrodeposition paint is excellent in throwing power and capable of forming a coating film excellent in performances such as durability, anticorrosivity etc., it has been widely adopted conventionally in application fields where these performances are required, for example, coating of motorcar body, coating of electric appliances etc.

An electrodeposition paint generally consists of a resin containing hydroxyl group as a base resin and a polyisocyanate compound blocked with a blocking agent as a curing agent.

Conventional blocked polyisocyanates dissociate the blocking agent usually at a higher temperature than 160° C., due to the structure of their blocking agent, and the freed isocyanate groups react with the hydroxyl groups of the base resin.

However, in recent years, plastics parts have been used together in case of coating of metal plates for car body in automobile industry and therefore a development of such a blocked polyisocyanate compound that dissociates the blocking agent at a low baking temperature, at which said plastics parts do not melt, and can react with the base resin.

As a method to dissociate the blocking agent from a blocked polyisocyanate compound at a relatively low baking temperature, for example, a process to block a polyisocyanate compound with an oxime has been known. However, there is a problem that an electrodeposition paint composition containing a polyisocyanate compound blocked with an oxime dissociates oxime blocking agent during storage, increases the paint viscosity and the smoothness of the electrodeposition coating surface deteriorates to a great extent.

The present inventors have been intensively conducting research aiming at developing a composition for electrodeposition paint, capable of solving problems such as mentioned above, excellent in storage stability and capable of forming a coating film excellent in low temperature curability. As a result, this time, they found that the above-mentioned purpose could be achieved by a resin composition for electrodeposition paint consisting of a resin containing hydroxyl group and a polyisocyanate compound blocked with an amidoalcohol having amide bond and alcoholic hydroxyl group in the molecule and completed the present invention.

SUMMARY OF THE INVENTION

Thus, according to the present invention, there is provided a resin composition for electrodeposition paint characterized by comprising (A) a resin containing hydroxyl group, and (B) a polyisocyanate compound blocked with an amidoalcohol having at least one amide bond and at least one alcoholic hydroxyl group in the molecule.

DESCRIPTION OF SPECIFIC EMBODIMENTS

Then the resin composition for electrodeposition paint of the present invention is described in more detail.

The electrodeposition paint composition of the present invention may be either anionic type or cationic type. Generally, however, a catoinic type one is preferable from a viewpoint of anticorrosivity etc.

Resin Containing Hydroxyl Group (A):

The resin containing hydroxyl group (A) used in the present invnetion can be any resin which is used generally as base resin in a composition for electrodeposition paint, contains hydroxyl group and anionizable group (for example, carboxyl group, sulfonic acid group etc.) or cationizable group (for example, amino group, quaternary ammonium group etc.) and is dispersible in water and there can be used resins of, for example, epoxy type, acrylic type, polybutadiene type, alkyd type, polyester type etc. Above all, a polyamine resin containing hydroxyl group represented by an amine-added epoxy resin containing hydroxyl group is preferable.

As the above-mentioned amine-added epoxy resin containing hydroxyl group there can be mentioned, for example, (i) an adduct of polyepoxide compound containing hydroxyl group and primary mono- or polyamine, secondary mono- or polyamine or primary/secondary mixed polyamines (cf. for example, U.S. Pat. No. 3,984,299); (ii) an adduct of polyepoxide compound containing hydroxyl group and secondary mono- or polyamine having a ketiminized primary amino group (cf. for example, U.S. Pat. No. 4,017,438); (iii) a reaction product obtained by etherification of a polyepoxide compound containing hydroxyl group and hydroxy compound having a ketiminized primary amino group (cf. for example, Japanese Laid-open Patent Publication No. 43013/1984).

The polyepoxide compound containing hydroxyl group used in the preparation of the above-mentioned amine-added epoxy resin containing hydroxyl group is a compound having two or more of each hydroxyl group and epoxy group in the molecule. It is preferable genrally to have a number-average molecular weight in the range of at least 200, preferably 400–4,000, more preferably 800–2,000 and an epoxy equivalent in the range of at least 150, preferably 180–2200, more preferably 400–1100. Particularly preferable is a product obtained by a reaction of a polyphenol compound and epichlorohydrin. As a polyphenol compound usable to form said polyepoxide compound containing hydroxyl group there can be mentioned, for example, bis-(4-hydroxyphenyl)-2,2-propane, 4,4-dihydroxybenzophenone, bis-(4-hydroxyphenyl)-1,1-ethane, bis-(4-hydroxyphenyl)-1,1-isobutane, bis-(4-hydroxy-tert-butyl-phenyl)-2,2-propane, bis-(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulfone, phenol novolac, cresol novolac etc.

Said polyepoxide compound containing hydroxyl group may be modified by partially reacting with polyol, polyetherpolyol, polyesterpolyol, polyamidoamine, polycarboxylic acid, polyisocyanate compound etc. and may be furhter graft-polymerized with ε-caprolactone, acrylic monomer etc.

Blocked Polyisocyanate Compound (B):

The blocked polyisocyanate compound (B) used in the present invention can be a product of an addition reaction of a polyisocyanate compound and an isocyanate-blocking agent and is used as a curing agent for the above-mentioned resin containing hydroxyl group (A). Usually said blocked polyisocyanate compound is preferably of completely blocked type wherein substantially all the existing isocyanate groups are blocked.

As a polyisocyanate compound used for the preparation of said blocked polyisocyanate compound (B) there can be mentioned, for example, aromatic polyisocyanate compound such as tolylene diisocyanate, diphenylmethane-4,4'- diisocyanate, diphenylmethane-2,4-diisocyanate, crude diphenylmethane diisocyanate, xylylene diisocyanate, phenylene diisocyanate etc.; alicyclic polyisocyanate compound such as isophorone diisocyanate, bis(isocyanatomethyl)-cyclohexane etc.; aliphatic polyisocyanate compound such as tetra-methylene diisocyanate, hexamethylene diisocyanate, methylene diisocyanate etc., and compounds containing terminal isocyanate obtained by reacting excess amount of these isocyanate compounds with a low molecular active hydrogen compound such as ethylene glycol, propylene glycol, trimethylolpropane, hexanetriol, castor oil etc. Among them, particularly an aromatic polyisocyanate compound is preferable from the viewpoint of anticorrosivity etc.

On the other hand, the isocyanate-blocking agent is to temporarily add and block the isocyanate groups of a polyisocyanate compound and the blocked polyisocyanate compound formed by addition is a substance which is stable at normal temperature and can reproduce free isocyanate groups through dissociation of the blocking agent at the baking temperature of a coating film.

The characteristic of the present invention lies in the point of using an amidoalcohol having at least one, preferably only one, amide bond (—NHCO—) and at least one, preferably only one, alcoholic hydroxyl group in the molecule as the isocyanate-blocking agent for a blocked polyisocyanate compound which can be stored stably for a long time without dissociation of blocking agent, even being stored in the form of a resin composition for electrodeposition paint, and can dissociate blocking agent at relatively low temperature of generally lower than 160° C., preferably about 130 - about 155° C., more preferably about 135-about 150, when the coating film is baked.

Such an amidoalcohol is preferably a substance which dissociates from the blocked polyisocyanate compound and evaporates from the coating film at the baking temperature of the coating film. Said amidoalcohol, therefore, is preferably of relatively low molecular weight and a low molecular compound of a molecular weight of usually less then 700, particularly less than 400, more particularly less than 300.

Thus, as the amidoalcohol used preferably as a blocking agent for a polyisocyanate compound according to the present invention there is included specifically, for example, a compound represented by the following formulae

$$R^1\text{—CONH—}R^2\text{—OH} \qquad (I)$$

$$HO\text{—}R^3\text{—CONH—}R^4 \qquad (II)$$

wherein
$R^1$ and $R^4$ each repesents straight chain or branched chain alkyl group of carbon number 1–6, preferably 1–4,
$R^2$ and $R^3$ each repesents straight chain or branched chain alkylene group of carbon number 1–6, preferably 1–4.

The amidoalcohol of the above-mentioned formula (I) can be prepared, for example, by amidization reaction of an alkanolamine repesented by the following formula

$$HO\text{—}R^2\text{—}NH_2 \qquad (III)$$

wherein $R^2$ has the above-mentioned meaning with a carboxylic acid represented by the following formula

$$R^1\text{—COOH} \qquad (IV)$$

wherein $R^1$ has the above-mentioned meaning, or its reactive derivative (for example, its ester compound).

As an alkanolamine of the above-mentioned formula (III) there can be mentioned, for example, monoethanolamine, n-propanolamine, isopropanolamine etc., and as a carboxylic acid of the above-mentioned formula (IV) or its reactive derivative there can be mentioned, for example, carboxylic acids or their alkyl esters such as formic acid, acetic acid, propionic acid, methyl formate, ethyl formate, methyl acetate, ethyl acetate, methyl propionate, ethyl propionate etc.

The amidoalcohol of the above-mentioned formula (II) can be prepared, for example, by amidization reaction of a hydroxycarboxylic acid represented by the following formula

$$HO\text{—}R^3\text{—COOH} \qquad (V)$$

wherein $R^3$ has the above-mentioned meaning, or its reactive derivative (for example, its ester compound) with a primary amine represented by the following formula

$$R^4\text{—}NH_2 \qquad (VI)$$

wherein $R^4$ has the above-mentioned meaning.

As the hydroxycarboxylic acid of the above-mentioned formula (V) or its reactive derivative there can be mentioned, for example, carboxylic acids containing hydroxyl group or their alkyl esters such as hydroxyacetic acid, hyroxypropionic acid, methyl hydroxyacetate, ethyl hydroxyacetate, methyl hydroxypropionate, ethyl hydroxypropionate etc. and as a primary amine of the above-mentioned formula (VI) there can be mentioned, for example, monomethylamine, monoethylamine, monoisopropylamine, monobutylamine etc.

The blocking of polyisocyanate compound using the above-mentioned amidoalcohols can be easily conducted according to per se known processes, for example, by reacting polyisocyanate compound and amidoalcohol at the ratio of approximately 1:1 (equivalent ratio) of isocyanate group of the polyisocyanate compound and hydroxyl group of the amidoalcohol at about 50-about 150° C.

In the above-mentioned blocking reaction there may be used amidoalcohol of only one kind or as mixture of more than two kinds. Optionally the above-mentioned amidoalcohol may be used as blocking agent together with a known alcohol, for example, aliphatic alcohols such as n-butanol, 2-ethylhexanol etc.; aromatic alcohols such as phenylcarbinol, methyl phenylcarbinol etc.; ether alcohols such as ethylene glycol monobutyl ether etc.. Its application amount, however, is desirably less than 50 mol %, particularly less than 30 mol % based upon the total amount with the amidoalcohol.

Resin Composition for Electrodeposition Paint:

The resin composition for electrodeposition paint of the present invention comprises the aforementioned resin containing hydroxyl group (A) as base resin component and the polyisocyanate compound blocked with the aforementioned amidoalcohol (B) as curing agent component.

The ratio of the above-mentioned component (A) and component (B) in the resin composition of the present invention may be varied in a wide range according to the performances desired for the coating film to be formed etc. and can be, as solid content ratio of the component (A) to the component (B), in the range of generally 99.9–50% by weight, preferably 90-55% by weight, more preferably 85–60% by weight of the component (A) and 0.1–50% by weight, preferably 10–45% by weight, more preferably 15–40% by weight of the component (B).

The resin composition for electrodeposition paint of the present invention can be compounded with, besides the component (A) and component (B), color pigment, anticorrosive pigment, extender pigment, dyestuff, additives etc. as necessary in a similar way as in case of usual electrodeposition paint. It is also possible to use it as a clear paint without compounding pigments. Moreover, it is also possible to use known curing agent such as alcohol-blocked isocyanate compound, oxime-blocked isocyanate compound etc. together with the blocked polyisocyanate compound (B) of the present invention. Such a known curing agent is used preferably not more than 50% by weight based upon the total solid content of the amidoalcohol-blocked polyisocyanate compound (B) and said curing agent.

As a color pigment there can be used, without particular restriction, for example, inorganic pigments such as titanium oxide, carbon black, iron oxide, lead chromate etc.; organic pigments such as aniline black, vermilion red, lake red, phthalocyanine blue, fast sky blue etc. Further, as an anticorrosive pigment it is preferable to use bismuth compounds. As a bismuth compound there can be mentioned, for example, bismuth oxide, bismuth hydroxide, basic bismuth carbonate, bismuth nitrate, bismuth benzoate, bismuth citrate, bismuth silicate etc. Among them bismuth hydroxide is particularly preferable. Moreover, as a bismuth compound it is possible to use an organic acid bismuth salt obtained by using an organic acid including an aliphatic hydroxycarboxylic acid. As an aliphatic hydroxycarboxylic acid usable in that case there can be mentioned, for example, glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, metylmalonic acid etc. Among them lactic acid is particularly preferable.

Furthermore, as an extender pigment there can be used, for example, kaolin, barium sulfate etc.

As a preparation process of the resin composition for electrodeposition paint of the present invention it can be conducted, without particular restriction, in a similar way as a preparation process of an electrodeposition paint usually conducted. For example, in case the base resin is a resin containing hydroxyl group, which has a cationizable group, it can be conducted usually by mixing a resin containing hydroxyl group (A) and a blocked polyisocyanate compound (B) and water-solubilizing or water-dispersibilizing through neutralization with a water-soluble organic acid such as acetic acid, lactic acid, formic acid etc., and in case the base resin is a resin containing hydroxyl group, which has an anionizable group, it can be conducted by water-solubilizing or water-dispersibilizing in a similar way as mentioned above, through neutralization with, instead of the above-mentioned water-soluble organic acid, alkali such as amine, alkali metal hydroxide etc.

As an electrodeposition coating process using the resin composition for electrodeposition paint of the present invention a usual electrodeposition coating process can be applied. It can be conducted, for example, under the condition of load voltage of 50–400 V by adjusting usually to 15–35° C. the temperature of the electrodeposition bath comprising the resin composition for electrodeposition paint of the present invention which has been diluted with deionized water etc. to a solid content concentration of about 5–40% by weight and adjusted pH of the system in the range of 4–9.

The film thickness of the electrodeposition coating film formable by using the resin composition for electrodeposition paint of the present invention is not particularly restricted but is preferable generally in the range of 10–40 μm based upon a cured film thickness. The baking temperature of the coating film is suitable at temperatures in the range of generally about 100-about 155° C., particularly about 140 - about 155° C.

The resin composition for electrodeposition paint of the present invention is excellent in storage stability, capable of forming a coating film excellent in low temperature curability and can be used preferably, for example, for undercoating of car body etc.

EXAMPLES

Then the present invention is described more specifically by examples. "Parts" and "%" mean "parts by weight" and "% by weight", respectively, unless specified.

Preparation Example 1
(Preparation of an Amine-added Epoxy Resin Containing Hydroxyl Group)

In a flask equipped with a stirrer, thermometer, nitrogen-introducing tube and reflux condenser 518 parts of epoxy resin with a number-average molecular weight 370 and epoxy equivalent 185 obtained by reaction of bisphenol A and epichlorohydrin was put and 57 parts of bisphenol A and 0.2 parts of dimethyl benzylamine were further added and the mixture was reacted at 120° C. until the epoxy equivalent reached 250. Then 213 parts of ε-caprolactone and 0.03 parts of tetrabutoxy titanium were added, warmed up to 170° C. and kept the temperature, watching the amount of unreacted ε-caprolactone in the sample taken from time to time by infrared absorption spectrum measurement, and at the point in time, when the reaction ratio reached over 98%, 148 parts of bisphenol A and 0.4 parts of dimethyl benzylamine were further added and the mixture was reacted at 130° C. until the epoxy equivalent reached 936. After that, 257.4 parts of methyl isobutyl ketone, 25.6 parts of diethylamine and 68.3 parts of diethanolamine were added, reacted at 80 for 2 hours and diluted with 143.4 parts of methyl ethyl ketone to obtain an amine-added epoxy resin containing hydroxyl group (A-1) with resin solid content 72% and amine value (resin solid content) 54.5.

Preparation Example 2
(Preparation of an Amidoalcohol)

In 20 parts of methyl ethyl ketone 61 parts of monoethanolamine and 46 parts of formic acid were reacted at 70° C. After confirming the disappearance of absorption of acid by infrared absorption spectrum measurement, the sovlent was removed at 40° C. under reduced pressure to obtain an amidoalcohol (C-1).

Preparation Example 3
(Preparation of an Amidoalcohol)

In 30 parts of methyl ethyl ketone 61 parts of monoethanolamine and 74 parts of propionic acid were reacted at 70° C. After confirming the disappearance of absorption of acid by infrared absorption spectrum measurement, the sovlent was removed at 40° C. under reduced pressure to obtain an amidoalcohol (C-2).

Preparation Example 4
(Preparation of a Blocked Polyisocyanate Compound)

In a flask 250 parts of diphenylmethane-4,4'-diisocyanate and 48 parts of methyl isobutyl ketone were added and heated at 60° C., to which 178 parts of the amidoalcohol (C-1) obtained in Preparation Example 2 were added drop by drop in 1 hour. Upon confirming the disappearance of absorption of isocyanate group by infrared absorption spectrum measurement, a blocked polyisocyanate compound (B-1) with 90% solid content was obtained.

Preparation Example 5
(Preparation of a Blocked Polyisocyanate Compound)

In a flask 250 parts of diphenylmethane-4,4'-diisocyanate and 54 parts of methyl isobutyl ketone were added and heated to 60° C., to which 234 parts of the amidoalcohol (C-2) obtained in Preparation Example 3 was added drop by drop in 1 hour. Upon confirming the disappearance of absorption of isocyanate group by infrared absorption spectrum measurement, a blocked polyisocyanate compound (B-2) with 90% solid content was obtained.

Preparation Example 6
(Preparation of a Blocked Polyisocyanate Compound)

In a flask 250 parts of diphenylmethane-4,4'-diisocyanate and 50 parts of methyl isobutyl ketone were added and heated to 60° C., to which a mixture consisting of 134 parts of the amidoalcohol (C-1) obtained in Preparation Example 2 and 67 parts of diethylene glycol monoethyl ether was added drop by drop in 1 hour. Upon confirming the disappearance of absorption of isocyanate group by infrared absorption spectrum measurement, a blocked polyisocyanate compound (B-3) with 90% solid content was obtained.

Preparation Example 7
(Preparation of a Blocked Polyisocyanate Compound, for Comparison)

In a flask 250 parts of diphenylmethane-4,4'-diisocyanate and 58 parts of methyl isobutyl ketone were added and heated to 60° C., to which 268 parts of diethylene glycol monoethyl ether was added drop by drop in 1 hour. Upon confirming the disappearance of absorption of isocyanate group by infrared absorption spectrum measurement, a blocked polyisocyanate compound (B-4) with 90% solid content was obtained.

Examples 1–3 and Comparative Example 1

A resin containing hydroxyl group and a blocked polyisocyanate compound were mixed at the compounding ratio shown in Table 1 mentioned later, added with 16 parts of 10% aqueous solution of acetic acid stirred homogeneously and then added drop by drop with 200 parts of deionized water in about 15 minutes while strongly stiring to obtain a clear emulsion for cationic electrodeposition with 30% solid content.

Coating Test

Dull finished cold rolled steel plate of 0.8×150×70 mm chemically trated wih Palbond #3030 (made by Nihon Perkerizing Company, zinc phosphate treating agent) was dipped in the electrodeposition paint obtained in Examples 1–3 and Comparative Example 1 and electrodeposition coating was conducted by using the plate as cathode. An electrodeposition coating film with a film thickness (based upon a dried film thickness) of about 20 μm was formed under the electrodeposition condition of a voltage of 300V, washed with water and then baked. Baking was conducted in 3 stages of atmospheric temperatures and for 20 hours baking time by using an electric hot air drier. Performance test results of the obtained coating plates were also shown in Table 1.

Performance tests were conducted according to the following methods.

Curability: The coating surface of each obtained electrodeposition coating plate was rubbed 20 times back and forth for about 3–4 cm length with 4-fold gauze soaked with methyl isobutyl ketone under 4 kg/cm$^2$ pressure and then the appearance of the coating surface was visually evaluated.

○: No scratch is observed on the coating surface.

Δ: Scrathes are observed on the coating surface, but no exposure of the ground is observed.

×: Coating film dissolves and the exposure of the ground is observed.

Anticorrosivity: Cross-cut lines were cut in the electrodeposition coating film with a knife reaching to the ground surface to which 840 hours' salt water spray test according to JIS Z-2371 was conducted and evaluated by the rust and blister width from the knife scratch.

◎: Maximum width of rust or blister is less than 1 mm from the cut part (one side).

○: Maximum width of rust or blister is more than 1 mm and less than 2 mm from the cut part (one side).

Δ: Maximum width of rust or blister is more than 2 mm and less than 3 mm from the cut part (one side) and blistering was rather remarkable at the flat part.

×: Maximum width of rust or blister is more than 3 mm from the cut part and blistering was seen all over the coating surface.

TABLE 1

|  | Example | | | Comparative Example |
|---|---|---|---|---|
|  | 1 | 2 | 3 | 1 |
| Composition (parts) | | | | |
| Resin containing hydroxyl group (A) | | | | |
| A-1 | 109.2 | 105.3 | 107.5 | 102.9 |
| Blocked polyisocyanate compound (B) | | | | |
| B-1 | 23.8 | | | |
| B-2 | | 26.9 | | |
| B-3 | | | 25.1 | |
| B-4 | | | | 28.8 |
| Performance Curability | | | | |
| 140° C. × 20 minutes baking | ○ | ○ | Δ | X |
| 160° C. × 20 minutes baking | ○ | ○ | ○ | X |
| 180° C. × 20 minutes baking | ○ | ○ | ○ | ○ |
| Anticorrosivity | | | | |
| 140° C. × 20 minutes baking | ○ | ○ | ○ | X |
| 160° C. × 20 minutes baking | ◎ | ◎ | ○ | Δ |
| 180° C. × 20 minutes baking | ◎ | ◎ | ◎ | ◎ |

What is claimed is:

1. A polyisocyanate compound blocked with an amidoalcohol having at least one amide bond and at least one alcoholic hydroxyl group in the molecule.

* * * * *